United States Patent [19]

Yoshinori

[11] Patent Number: 4,588,331
[45] Date of Patent: May 13, 1986

[54] THROWAWAY-TYPE BALL END MILL AND THROWAWAY TIP USED IN SAME

[76] Inventor: Mizuki Yoshinori, c/o Dijet Industrial Co., Ltd., No. 1-18, Kami-Higashi 2-chome, Hirano-ku, Osaka, Japan

[21] Appl. No.: 530,126

[22] Filed: Sep. 7, 1983

[30] Foreign Application Priority Data

Sep. 16, 1982 [JP] Japan .................. 57-140579[U]
Dec. 25, 1982 [JP] Japan .................. 57-198722[U]

[51] Int. Cl.⁴ .................................... B26D 1/00
[52] U.S. Cl. .............................. 407/36; 407/42; 407/113
[58] Field of Search .................. 407/36, 37, 38, 39, 407/42, 110, 113; 408/713

[56] References Cited

U.S. PATENT DOCUMENTS

| | | | |
|---|---|---|---|
| 4,072,438 | 2/1978 | Powers | 407/42 |
| 4,132,493 | 1/1979 | Hosoi | 407/53 |
| 4,412,763 | 11/1983 | Shallenberger | 407/42 |
| 4,443,136 | 4/1984 | Kemmer | 407/110 |

FOREIGN PATENT DOCUMENTS

| | | | |
|---|---|---|---|
| 2902420 | 7/1980 | Fed. Rep. of Germany | 408/713 |
| 157418 | 12/1980 | Japan | 407/42 |

*Primary Examiner*—Leonidas Vlachos

[57] ABSTRACT

A throwaway tip and a shank both for use in ball end mills, wherein the tip is a throwaway tip of an approximately flat plate-shape, provided at its side face with a convex cutting edge starting from the center portion when viewed from the bottom and a straight-lined cutting face following thereafter, the ridgeline of these cutting edges being formed connecting a bottom face cutting edge, a circumferential side cutting edge, and a top face cutting edge when viewed from the top. Adjoining the top face cutting edge is an inclined fixing side face for use in preventing the tip from floating up. The shank which is to bear the throwaway tip is provided with an inclined tip-fixing wall corresponding to the above-mentioned fixing side face of the tip.

10 Claims, 19 Drawing Figures

FIG. 1
FIG. 2
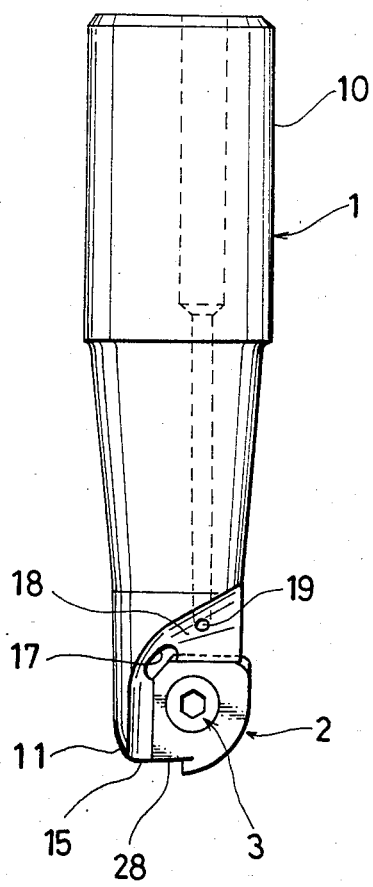
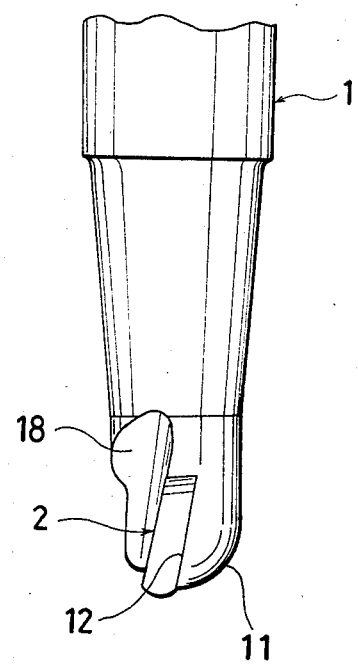

THROWAWAY-TYPE BALL END MILL AND THROWAWAY TIP USED IN SAME

BACKGROUND OF THE INVENTION

This invention relates to improvements in a throwaway-type ball end mill.

Heretofore, it has been well-known that there are used ball end mills being constructed in such a manner that their cutting edges have a curve convex to the direction of rotation when viewed from the bottom and that the curve of the cutting edge of the center portion of the mill has a greater curvature than that of the cutting edge of the outer circumferential portion mainly for the purpose of cutting such metallic molds that are hard-cutting materials and full of irregularities on the surface to be cut, therein displaying a commensurate effect.

However, the cutting range of such a kind of ball end mill includes heavy cutting, as mentioned above, during which the cutting edge here is susceptible intermittently to a great cutting load.

When applying the throwaway type under these conditions and making a tip wherein the form of its cutting edge is composed of a circular arc and a straight line held mechanically by the shank, the desired restraint forces cannot be obtained and the tip being fixed on the shank in its turn generates chattering or becomes shaky and rickety, as a result bringing about the damage to cutting edges of the tip.

This invention has been contrived in consideration of the above-described points, and has for its object the provision of a throwaway-type ball end mill of such construction that during use the restraint forces of the tip against the will not deteriorate, and chattering or shakiness of the tip will not occur.

Further, this invention relates to a throwaway tip for use in ball end mills.

Heretofore, there have been used ball end mills wherein the form of the cutting edge viewed from the bottom is convex at the vicinity of the starting end of the cutting edge which has a smaller curvature at its outer circumferential side, but when viewed from the flank, its outer circumferential side forms a cylindrical shape, hemispherical at its end face, for use in the cutting operations of metals, especially for use in cutting various metallic molds which are of hard-cutting materials and full of irregularities in the surface to be cut.

However, such a ball end mill whose cutting range is designed for die-milling, as mentioned above, had some characteristics which make it unfit for cutting complicated geometries of various molds, for example, the deep groove, the somewhat curved inward stretch or the inclined plane which require tilting a ball end mill having a long effective cutting edge or else a tool-fitting head of a machine tool to a prescribed extent.

This invention has been contrived in consideration of the above. Therefore, the second object of this invention is to provide an economical, long lived throwaway tip for use in ball end mills, which is easy to operate without any necessity of making change in edge-length or machine tool even in the cutting of deep grooves or inward stretches having some curvature, or inclined planes.

Further, the third object of this invention is to provide a ball end mill having a throwaway tip which is able to cut easily the material to be cut having a complicated and ragged form, for example, such as a deep groove, without generating any chattering or shakiness of the tip.

SUMMARY OF THE INVENTION

The throwaway-type ball end mill of this invention is constructed in such a manner that there is provided at its end part a spherically shaped portion, a tip-fixing concave part of the shank body being provided at a prescribed place of the above-mentioned end part, which consists of a tip-fixing seat and a tip-fixing wall. The tip (cutter insert) corresponds to the above-mentioned fixing concave part of the shank body and has an inclined tip-fixing side face where at least one side of the tip-fixing wall is inclined for preventing the floating-up of the tip, the tip fixed detachably on the fixing concave part. The tip is formed with several cutting faces rather than only one.

In other embodiments, the throwaway tip for use in the ball end mill of the present invention has provided on one or both sides one or two straight-lined cutting edges and convex, cutting edges the ridgeline of the above-mentioned convex cutting edges and one or two straight-lined butting edges tying a bottom cutting edge and a circumferential cutting edge in an arc-shaped or combined straight-lined and arc-shaped row a top face cutting edge extends from the circumferential cutting edge and has an arc-shaped or straight-lined ridgeline, thereby forming a prescribed relief face on the above-mentioned cutting edge.

In still other embodiments of the throwaway-type ball end mill of the present invention, the throwaway tip (insert) has a convexly curved front cutting edge, a circumferential cutting edge extending therefrom, a top face cutting edge, arc-shaped or straight-line shaped, being tied thereto, and an inclined, flat face being adjacent to the top face cutting edge. The shank body bearing such a tip detachably thereon, is spherically shaped at its end part, and possesses a tip-fixing concave part receiving the above-mentioned tip at a prescribed place. This tip-fixing concave part includes a tip-fixing seat and a tip-fixing wall. At least one side face of the tip-fixing wall has a tip-fixing side face closely confronting the above-mentioned inclined, flat face of the above-mentioned tip. The above-mentioned inclination of the above-mentioned flat face of the above-mentioned tip is so contrived as to prevent the tip from floating-up.

BRIEF DESCRIPTION OF THE DRAWINGS

FIG. 1 is a front view of a throwaway-type ball end mill according to the invention;
FIG. 2 is a side view of the principal part of FIG. 1;
FIGS. 10 and 11 each show a tip according to the invention, of which
FIG. 10 is a top view thereof,
and FIG. 11 is a side view thereof.

DETAILED DESCRIPTION OF THE INVENTION

Figure 3:
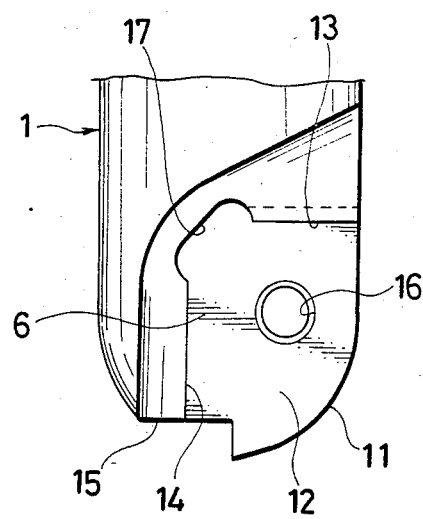
FIG. 3 is an enlarged front view of the principal part.
Figure 4:
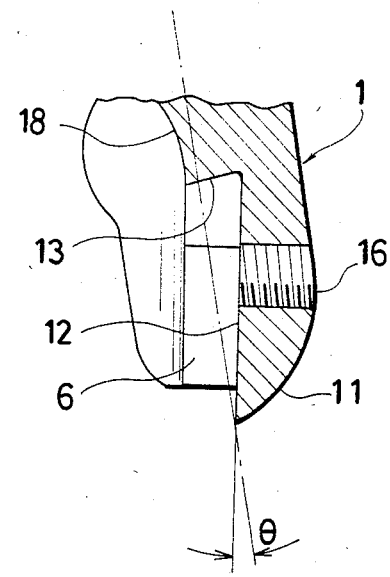
FIG. 4 is a side view of FIG. 3.
Figure 5:
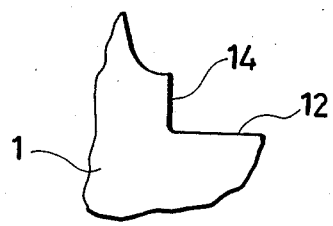
FIG. 5 is a bottom view of FIG. 3.

Description will be now directed to an example of the invention with reference to the accompanying drawings:

As shown in FIGS. 1 to 5, a shank 1 has a handle part 10 which may be of a straight-lined shape or of a tapered one according to circumstances, on the one side, while on the other side the end part of it is formed with a spherical surface 11. In a prescribed place, there is provided a insert-fixing (tip-fixing) concave part 6 which consists of an insert-fixing (tip-fixing) seat 12, an insert-fixing (tip-fixing) wall 13 formed for preventing the tip (cutter insert) from floating up and being given an appropriate inclined angle, and an insert-fixing (tip-fixing) wall 14 formed vertically perpendicular to the above-mentioned tip-fixing seat 12.

On the head of the spherical surface 11, there is provided a cutaway part 15, while in a prescribed portion of the fixing seat 12, there is bored a threaded hole 16 to be used for screwing thereinto a tip-fixing clamping bolt. On the other hand, in order to make the posture of the tip return to a normal condition at the time of its tip being fixed and to prevent the failure, a concealed wall 17 is formed in the corner part made of the fixing walls 13 and 14, while to the side of the direction of rotation of the above-mentioned fixing concave part 6, a tip pocket 18 is provided for the purpose of promoting easy removal of the chips produced at the time of the cutting operations.

The reference numeral 19 indicates an air hole which penetrates through from the handle part 10 to a prescribed location in is the tip pocket 18. By supplying air from outside to the air hole 19 thus formed, the tip is effectively cooled down to lengthen the tool life and further to be able to efficiently remove the chips, thereby preventing damage of the tip and permitting the surface to be cut to be favorably finished with good precision.

Figure 6:
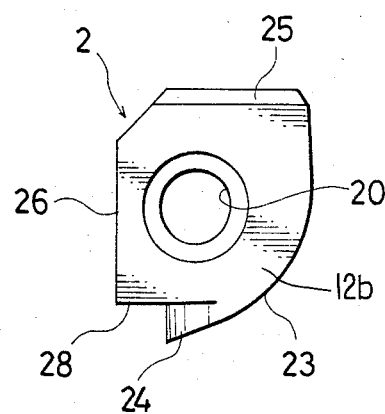
FIG. 6 is a front view of a throwaway tip.
Figure 7:
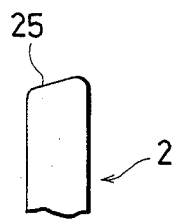
FIG. 7 is a side view of the principal part of FIG. 6.
Figure 8:
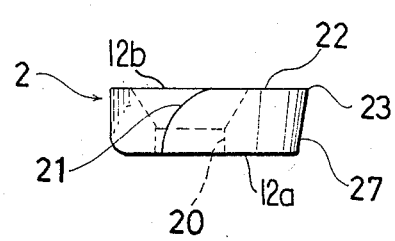
FIG. 8 is a bottom view of FIG. 6.

The throwaway tip 2 which is fixed on the above-mentioned tip-fixing concave part 6 by the clamping bolt 3 has a seat contacting (rear) surface 12a and an opposite (front) surface 12b and is provided with a fitting hole 20 which is possessed of a saucer-like part, as shown in FIGS. 6 to 8, and has, on its one side, a cutting face at the periphery of the tip between surfaces 12a and 12b having a ridgeline 23 of cutting edges of about ¼ arc (convex) forming a circular arc cutting edge 21 at the bottom of the lower end of the tip extending from surface 12a to surface 12b and a planar cutting edge 22 on surface 12b continuously therewith, and further has a cutting edge being possessed of a rake face 24 extending from the cutting (lower) end up to the outer circumference, an insert-fixing side face 25 at the top of the upper end of the tip inclined at an angle almost the same as an inclined angle of the tip-fixing wall 13 in the above-mentioned tip-fixing concave part 6, and an insert-fixing side face 26 corresponding to the tip-fixing wall 14 in the above-mentioned concave part 6, wherein a relief face 27 for the ridgeline 23 of the above-mentioned cutting face is imparted a prescribed relief angle. As is clearly apparent from FIGS. 6 and 8, the curvatures of convex cutting edge 21 is substantially greater than that of planar cutting edge 22.

By forming the rake face 24 with a stepped part 28 in the vicinity of the starting end either above or below according to the increase or decrease of the degree of the depth of cut, not only can the life of the tip 2 be lengthened, but also desired deep or shallow cuttings become manageable.

In the above-described example, the tip-fixing wall 14 of the tip-fixing concave part 6 formed on the spherical part 11 of the shank is perpendicular to the tip-fixing seat 12, and the side face 26 of the throwaway tip also is made in the same manner. However, this invention is not limited to this example. It is good if the wall 14 and the seat 12 both are given suitable angles of inclination to be used for a particular purpose, or if the fixing wall 13 is perpendicular, the fixing wall 14 is inclined, and the tip is attached thereto correspondingly. On the other hand it becomes possible to cope with various kinds of cutting conditions if the tip-fixing concave part 6 is given a prescribed plus or minus axial angle $\theta$.

As described above, since the fixing wall of the tip-fixing concave part 6 has a suitable inclined angle, and, correspondent to this, the side face of the throwaway tip has almost the same inclined angle, the tip can be fit in the above concave part 6 firmly and certainly, and a throwaway-type ball end mill that is highly efficient in cutting, long-lived, and easy to handle without fear of generating unexpected slacking or chattering or failure of the tip, even if used for heavy cutting where hard-cutting material full of irregularities in the surface to be cut must be treated under a great deal of intermittent cutting load, is provided.

Figure 9A:
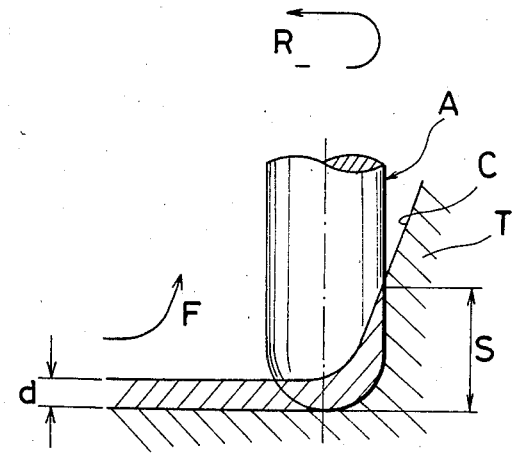
FIGS. 9(a) and (b) are explanatory drawings of the working of the tip.
Figure 9B:
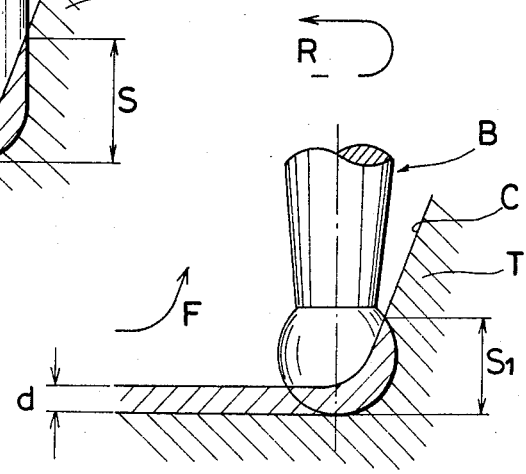

Description will be now directed to the difference of the working between conventional ball end mills and the ball end mill according to this invention:

The one shown in FIG. 9(a) is an explanatory drawing of the case where a material to be cut T having an inclined face C was cut by using a conventional ball end mill A, while FIG. 9(b) is an explanatory drawing of the case where a material to be cut T having the same inclined face C was cut by the ball end mill according to the invention.

As understood from the drawings, in the case of the conventional end mill A, when attempting to cut the inclined face C at a depth of cut d mm while giving feed F, then it is necessary that the effective edge length of the end mill A is formed to be long. Accordingly, the cutting load applied to one edge becomes great, and the rigidity of the shank or the mechanical horsepower is required to be great, wherefore failure or damage is liable to occur at the shank and the edge of the tool A, and a desired tool life also cannot be expected.

When trying to lengthen the tool life by shortening the effective length of the edge against the same amount of cutting, then it is necessary to change the fitting posture of the tool A against the inclined face C of the material to be cut. In order to do so, it may be good if the operations are made by tilting the toolfitting head of the machine tool to a required extent. Nevertheless, this is not a preferable measure because of taking much setup time.

Referring to the ball end mill B according to the invention shown in FIG. 9(b), when cutting by the use of a top face cutting edge 37, or 37a (See FIGS. 10–14)

having an arc-shaped or straight-lined ridgeline following a circumferential cutting edge under the same conditions as in the abovementioned conventional example (a), then the effective length of edge S₁ is lessened, thereby the cutting load applied to one edge is reduced, and the required horsepower of the shank and the machine tool is lightened, with the result that it becomes possible to prevent the chattering or the damage of the shank as well as the failure of the cutting edge and to lengthen the tool life by a large margin. Furthermore, the reduction of the total cost attributable to the versatility of this machine on the basis of the reasonable horsepower mechanically required has a remarkable significance. Incidentally, reference numeral R in the figure indicates the direction of rotation of the tool.

Figure 10:
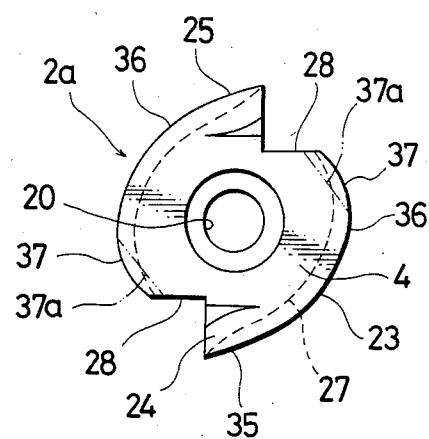
Figure 11:
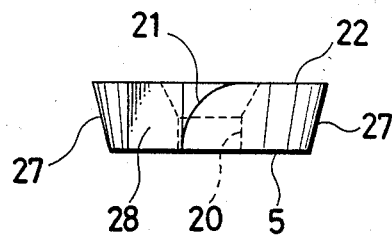

Now the throwaway tip 2a according to the invention will be described with reference to FIGS. 10 and 11:

This tip has at its central part a fitting hole 20 for inserting the clamping bolt for use in fixing the tip on the tip-fixing seat of the shank. The tip 2a is of a nearly flat plate-shape, one side face of which is formed as a rake face 4 and the other side face as a fixing face 5. At the under and right sides of tip 2a, there are formed successively the convex cutting edge 21 and the straight-lined (planar) cutting edge 22 in the form seen from the bottom (FIG. 11), (the same arrangement is provided also at the upper and left sides). The ridgeline generated by these cutting edges 23 makes three contacts among the straight-lined (planar) bottom face cutting edge 35, the arc-shaped circumferential cutting edge 36, and the arc-shaped top face cutting edge 37 connect to each other smoothly, in the form seen from the top, wherein the cutting edges on both sides each are provided with respective relief faces 27. Further, adjacent to the convex cutting edge 21, there are provided flat faces 28 so as to be able to stably hold the tip 2a at the tip-fixing seat of the shank.

In this connection, it will do if the above-mentioned bottom face cutting edge 35 is made arc-shaped and connecting to the circumferential cutting edge 36, so that about a quarter of the cutting edge is arc-shaped, while the top face cutting edge 37 may be also straight-lined with an inclination. Thus, the formation of the cutting edge of this tip is characterized in that the top face cutting edge is formed above the circumferential cutting edge connecting to the bottom face cutting edge, and the particular shape of each cutting edge is formed to correspond to the form of the surface to be cut.

This example, is designed in such a manner that cutting edges are provided symmetrically at the top and bottom of the tip so as to be able to substitutionally use one cutting edge when the other cutting edge is damaged, by turning the direction of the tip 1800. However, it may be also commendable that one cutting edge is formed only either above or below, and its opposite side is so made as to be able to be easily fixed fast on the wall face of the tip-fixing seat of the shank, as a result of which the tip-holding force of the shank is strengthened to enable heavy cutting, and the tool life becomes also longer.

Figure 12:
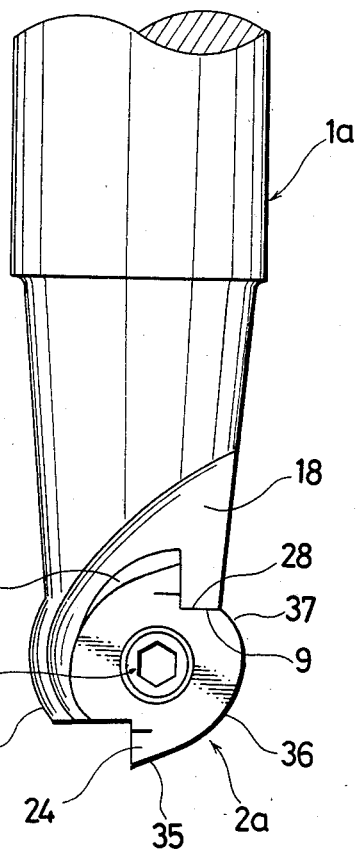
FIG. 12 is a front view of a ball end mill on which a tip according to the invention has been loaded.
Figure 13:
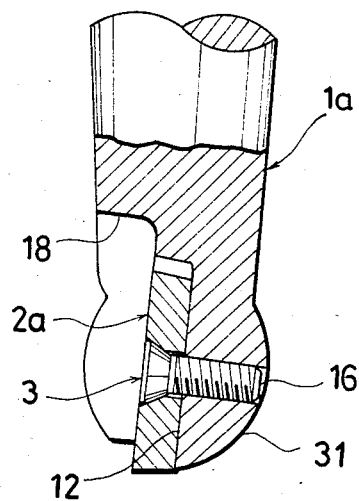
FIG. 13 is a sectional and broken view of the principal part of FIG. 12.
Figure 14:
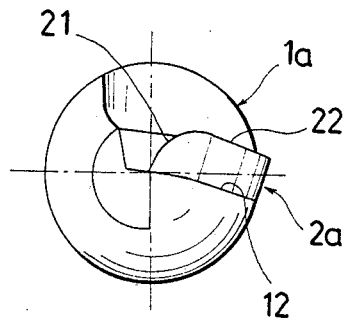
FIG. 14 is a bottom view of FIG. 13.

The above-mentioned tip 2a is used in such an arrangement that, as shown in FIGS. 12 to 14, the tip-fixing concave part of the hemispherical part 31 on the head of the shank 1a is provided with the screw hole 16 correspondent to the fitting hole 20 of the tip and also the tip-fixing wall 9 flush with the flat face 28 of the tip, that the above-mentioned tip fits in the tip-fixing seat 12 of the shank 1a the tip can be inserted therein in the normal state with the chip-removing groove 18 on the fore side of the rotation of the fixed seat, and that the tip 2a is fixed on the shank 1a by means of the clamping bolt 3. In such a state, the tool thus obtained can be loaded on the machine tool (not shown in the figure) and put in use.

EXAMPLE

Using the conventional-type ball end mill and the ball end mill of a diameter 25.4 mm, having one cutting edge according to the invention the cutting operation for die-milling the material to be cut—S55C (a standard Japanese code for a particular carbon steel containing 0.52–058% carbon, 0.75–0.35% silicon, 0.60–0.90% manganese, under 0.030% phosphorous and under 0.035% sulfur) was done on a 30 KW vertical milling machine. The cutting in this case was subject to the condition of a dry cutting (air blow) wherein the speed of rotation =1200 rpm, the circumferential speed =96 m/min, and the feed rate in the range 360 to 450 mm/min (0.3 to 0.375 mm/rev.). The comparative test was given at 70 mm of the projecting length from the end face of the holder to the pointed end of the edge.

As a result, it was proven that in the conventional-type ball end mill, the cutting resistance increased on account of its length of edge being long, the chatter occurred, and it was impossible to conduct the upward milling of the wall face of the material to be cut. On the other hand, the ball end mill according to the invention could cut smoothly even when the depth of cut reached 2 mm on the basis of its length of edge being short without increasing the cutting resistance and creating shakiness, being accompanied also by good upward milling of the wall face of the material to be cut.

Figure 15:
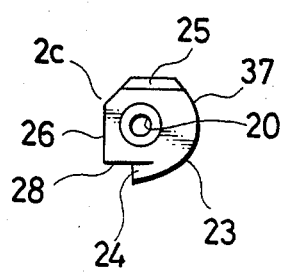
FIG. 15 is a top view showing a face having a top face-cutting edge on the throwaway tip of FIG. 6.
Figure 16:
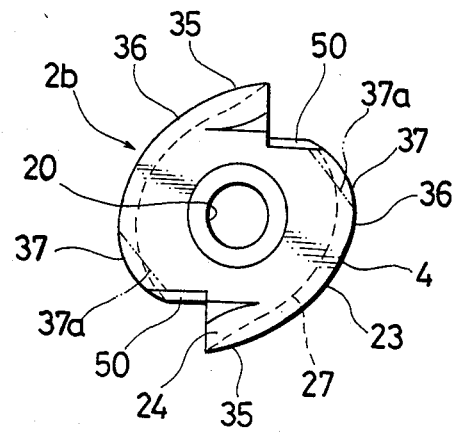
FIG. 16. is a top view showing an inclined, flat face on the throwaway tip of FIG. 10.
Figure 18:
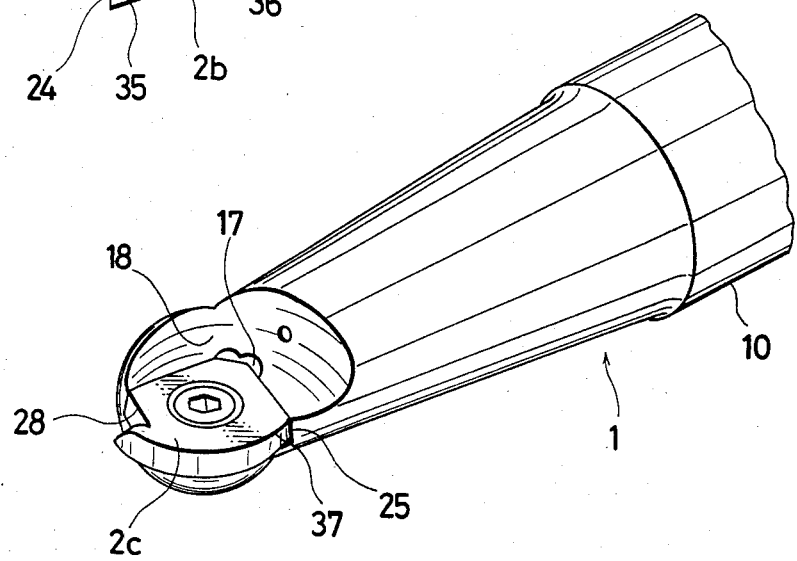
FIG. 18 is a perspective view showing a ball end mill which bears the tip of FIG. 15.

Description will be now directed further to the throwaway-type ball end mill according to the invention, with reference to FIGS. 15 to 18:

The throwaway tip 2c shown in FIG. 15 is provided with the top face cutting edge 37 on the upper part of a cutting edge otherwise similar to the throwaway tip 2 shown in FIG. 6. It does not matter if this top face cutting edge 37 is circular arc-shaped or straignt-lined, as mentioned above (See FIG. 10). On the other hand, the side face 25 is inclined, as mentioned before (See FIG. 7), while the side face 26 also may be made inclined likewise. The tip 2c can be loaded on the shank 1 as shown in FIG. 18.

Figure 17:
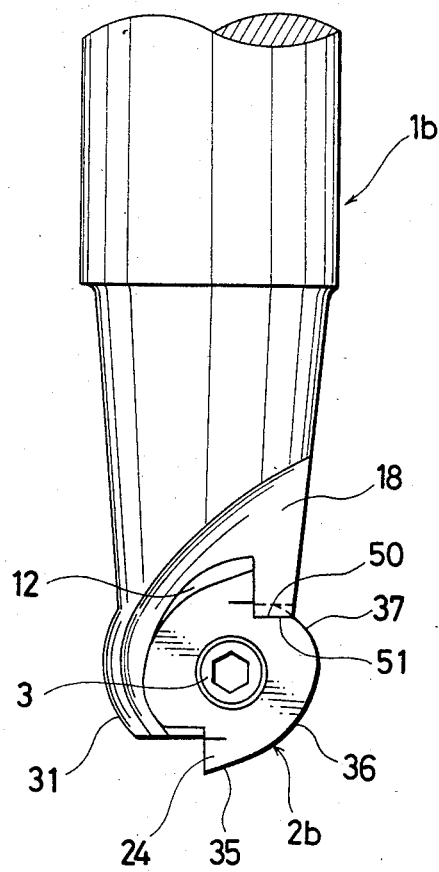
FIG. 17 is a top view showing the ball end mill which bears the throwaway tip of FIG. 16.

As understood from the above, the tip 2c, which is capable of accomplishing the steady loading on the shank without chattering or shakiness, as mentioned above with reference to FIGS. 1 to 7, has the ability to effectively cut the material to be cut having an inclined face C such as is shown in FIGS. 9(a) and 9(b), because of having the top face cutting edge 37. The throwaway tip 2b shown in FIG. 16 has an inclined flat face 50 and is otherwise similar to the throwaway tip 2a having a flat face 28, shown in FIG. 10. This inclined, flat face 50 has the same function as the inclined side face 25 of the throwaway tip shown in FIG. 6, that is, when being fitted to the shank, the throwaway tip 2b is protected from floating up off the fixing seat by virtue of this inclined flat face 50. This throwaway tip 2b can be regarded as one provided with two cutting edges which are the same as the one that is shown in FIG. 15, symmetrically with respect to the fitting hole 20. Since the two identical cutting edges are provided symmetrically, it is natural that the stepped part 28 in FIG. 15 is modified correspondent to the inclined flat face 50 in FIG. 16. The throwaway tip 2b of this type is detachably loaded on the shank 16, as shown in FIG. 17. FIG. 17 is almost the same as FIG. 12, the difference between them being that the tip 2b has the respective inclined flat faces 50 and these faces are made to be inclined correspondently in the place where the face of the protrusion of the shank 1b is indicated by the dotted line. It goes without saying that the tip 2b has the capability of making use the one cutting edge in case the other cutting edge has become worn or been damaged. Further, the tip 2b is able to effectively cut the inclined face C of the material to be cut T because it has the top face cutting edge 37, and also able to be held fittingly on the shank 1b because it has the inclined flat face 50.

What is claimed is:

1. A removable cutting insert for a ball end mill, comprising a body having
    opposite front and rear surfaces, each having a top and a bottom opposite said top, and opposite first and second sides at the peripheries of said front and rear surfaces extending between said top and said bottom;
    a planar cutting edge extending from said bottom in a plane at said front surface, upward along said first side, a convex cutting edge continuous to one end of said planar cutting edge extending convexly on said bottom between said front surface and said rear surface, said planar cutting edge including a bottom cutting edge on said bottom continuous to said convex cutting edge, an arched circumferential cutting edge continuous to said bottom cutting edge extending along the periphery of said front surface at said first side, and a top cutting edge at said top extending from and continuously to said circumferential cutting edge toward said second side, and inclined relief faces extending from said convex and planar cutting edges toward said rear surface;
    a first insert-fixing face on said top between said front surface and said rear surface; and
    a further cutting edges and a second insert-fixing face respectively identical to said first and second cutting edges of said first insert-fixing face, located 180° with respect thereto about a central axis of said insert perpendicular to said front surface, so that said insert may be identically used for cutting in each of two 180° rotated orientations.

2. An insert as in claim 1, wherein said top cutting edge is straight.

3. An insert as in claim 1, wherein said top cutting edge arcs smoothly into said circumferential cutting edge.

4. An insert as in claim 1, wherein said bottom edge arcs smoothly into said circumferential cutting edge and said convex cutting edge.

5. An insert as in claim 1, wherein said body has a hole extending therethough opening in said front and rear surfaces for receiving a bolt for fixing said insert to a shank of the ball end mill.

6. An insert as in claim 1, wherein said convex cutting edge has a curvature substantially greater than that of said planar cutting edge.

7. A ball end mill, comprising:
    a longitudinally extending shank having a ball end, said ball end having a concave insert-fixing portion including an insert-fixing seat and an insert-fixing wall;
    a removable cutting insert removably fixed in said insert-fixing portion, said insert having:
    a front surface and a rear surface opposite said front surface, each having a top and a bottom opposite said top, and opposite first and second sides at the peripheries of said front and rear surfaces extending between said top and said bottom,
    a planar cutting edge extending from said bottom in a plane at said front surface, upward along the periphery of said front side at said first side, and a convex cutting edge continuous to one end of said first cutting edge extending convexly on said bottom between said front surface and said rear surface, said first cutting edge including a bottom cutting edge continuous to said convex cutting edge, an arched circumferential cutting edge continuous to said bottom cutting edge extending along the periphery of said front surface at said first side, and a top cutting edge at said top extending from and continuously to said circumferential cutting edge toward said second side, and inclined relief faces extending from said planar and convex cutting edges toward said rear surface,
    a first insert-fixing face adjacent said top cutting edge closely mating with said insert-fixing wall, said rear surface being seated against said insert-fixing seat with said planar and convex cutting edges exposed for cutting, and
    further cutting edges and a second insert-fixing face respectively identical to said first and second cutting edges and said first insert-fixing face, located 180° with respect thereto about a central axis of said insert perpendicular to said front face so that said insert may be identically used for cutting in each of two 180° rotated orientations; and
    means for removably fixing said insert in said insert-fixing portion.

8. A ball end mill as in claim 7, wherein said insert-fixing wall is inclined so as to intersect said seat at an acute angle, said first insert-fixing face being inclined so as to intersect said rear surface at an acute angle so as to mate with said insert-fixing wall.

9. A ball end mill as in claim 8, wherein said ball end has an upper end and exposed lower end opposite said upper end, said insert-fixing wall extending generally perpendicularly to the direction between said upper and lower ends and being located at said upper end.

10. A ball end mill as in claim 7, wherein said convex cutting edge has a curvature substantially greater than that of said planar cutting edge.

* * * * *